Sept. 2, 1952 R. B. LAIRD 2,608,772
DUAL PURPOSE GROUND WORKING IMPLEMENT
Filed March 17, 1947 2 SHEETS—SHEET 1

INVENTOR.
Royal B. Laird
BY
ATTYS

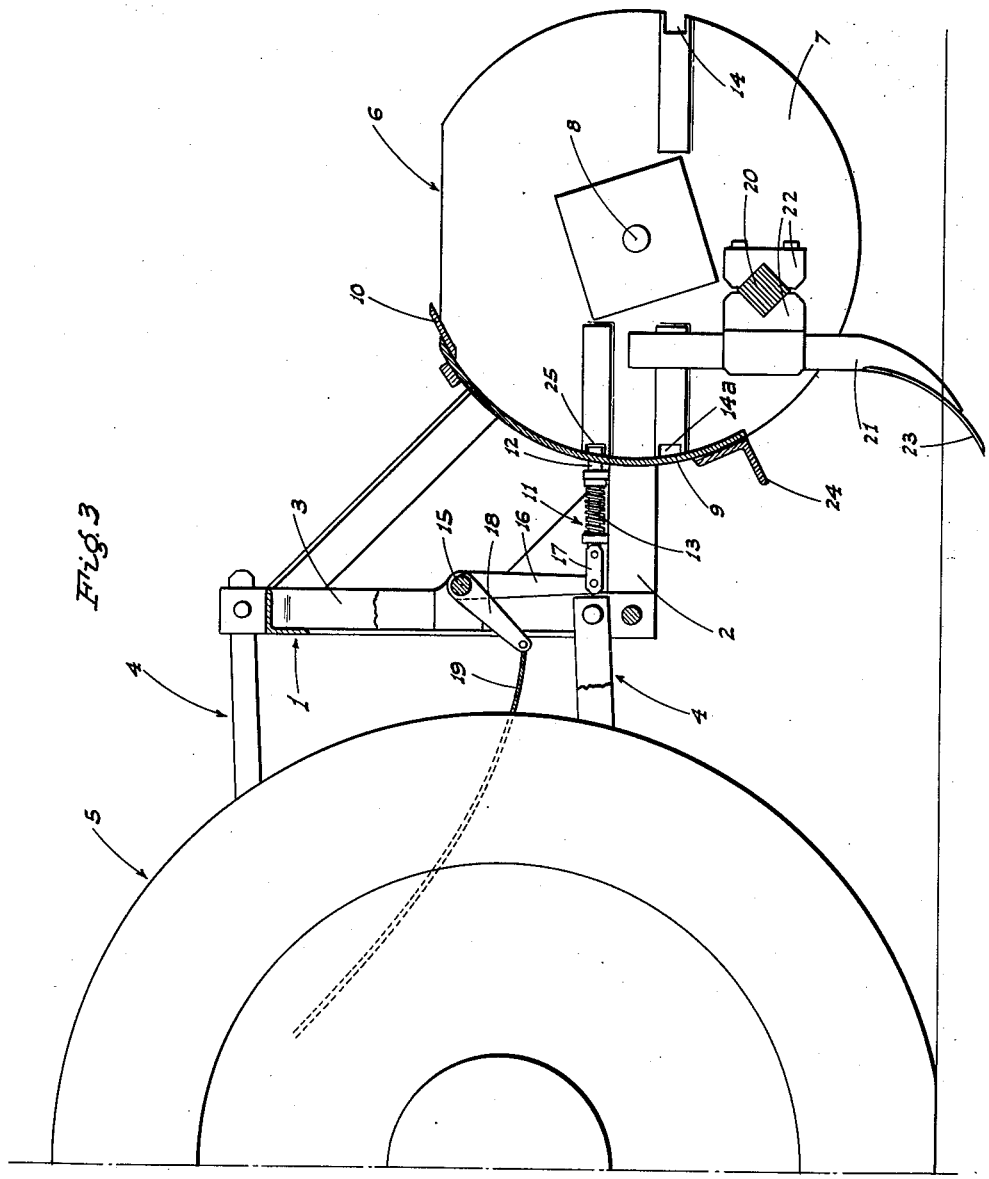

Patented Sept. 2, 1952

2,608,772

UNITED STATES PATENT OFFICE 2,608,772

DUAL PURPOSE GROUND WORKING IMPLEMENT

Royal B. Laird, Merced, Calif.

Application March 17, 1947, Serial No. 735,219

4 Claims. (Cl. 37—145)

1

This invention relates to, and it is an object to provide, a novel, dual-purpose ground working implement; such implement being operative to scrape and move earth, or to chisel or scarify the same, selectively.

Another object of the invention is to provide a dual-purpose ground working implement, as above, which includes a draft frame adapted to be coupled to a tractor, and a rotary structure mounted on the draft frame for rotation about a transverse horizontal axis; there being means to releasably latch such rotary structure in different rotative positions, said structure including instrumentalities operative to scrape and move earth in one position of the structure and to chisel or scarify the earth in another position of said structure.

A further object of the invention is to provide an implement, as described, wherein said rotary structure is bowl-like, including rotary ends connected by a back wall having a transverse cutting and digging blade along its lower edge between said ends for accomplishment, in one position of the rotary structure, of the scraping operation; the chiseling or scarifying operation being accomplished by chisel teeth which are mounted on a transverse tool bar on said structure and project upwardly when the transverse blade is in use. Rotation of the structure to another position of adjustment elevates the blade and lowers the chisel teeth for use.

A further object of the invention is to provide a practical dual-purpose ground working implement, and one which will be exceedingly effective for the purpose for which it is designed.

These objects are accomplished by means of such structure and relative arrangement of parts as will fully appear by a perusal of the following specification and claims.

In the drawings:

Fig. 3 is an enlarged longitudinal sectional elevation showing the position of the rotary structure when the chisel teeth are in working position.

Figure 1:
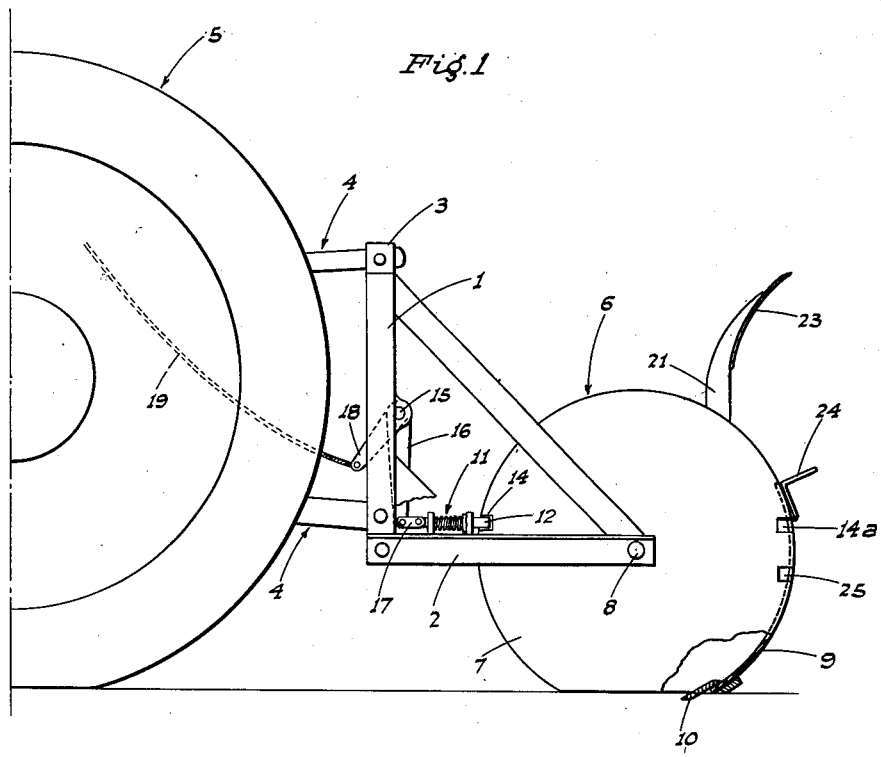
Fig. 1 is a side elevation of the implement as coupled in draft relation to a tractor; the rotary cutting and digging blade being disposed for working.
Figure 2:
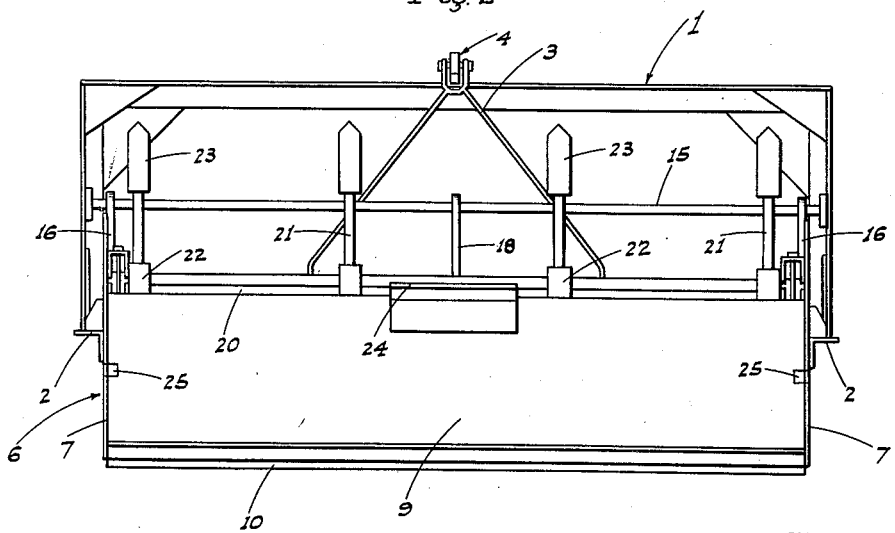
Fig. 2 is a rear end view of the implement with the parts in the position of Fig. 1.

Referring now more particularly to the characters of reference on the drawings, the implement comprises an upstanding, transversely extending draft frame I which includes, at the ends and bottom thereof, rearwardly projecting draft beams 2. The draft frame I incorporates an A-frame 3 pivotally connected to the draft and lift arms of a power-actuated lift type hitch assembly, indicated generally at 4, of a tractor; said tractor being indicated in part at 5. The lift-type hitch assembly 4 is power adjustable vertically by the operator from his seat on the

2 tractor, whereby to control the working depth of the implement.

A bowl-like rotary structure, indicated generally at 6, extends between the draft beams 2 rearwardly of the main portion of the draft frame I, said rotary structure including substantially circular rotary ends 7 journaled in connection with said draft beams 2; the rotary ends 7 of the structure 6 being connected together by a transverse, arcuate wall 9 of limited circumferential extent.

A transverse, cutting and digging blade 10 is fixed in connection with the edge of the wall 9, which is lowermost when said wall is disposed to the rear of the rotary structure 6, i. e. as in the position shown in Fig. 1.

The rotary structure 6 is releasably held in such position by a pair of latch units, indicated generally at 11, mounted on the draft beams 2 and including plungers 12 urged rearwardly by springs 13 to holding engagement in corresponding notches 14 formed in the rotary ends 7 of the structure 6.

The spring-pressed latch units 11 are releasable from the notches 14 by the following arrangement:

A cross shaft 15 is journaled horizontally on the upstanding draft frame I and includes depending radial levers 16 substantially alined with the plungers 12 and pivotally connected to the latter by links 17.

A forwardly and downwardly extending radial arm 18 is fixed on the cross shaft 15 intermediate its ends, and a pull cord 19 extends from the radial arm 18 upwardly to adjacent the operator's seat on the tractor. Upon a pull being exerted on the cord 19 the arm 18 swings up, causing forward swinging of the radial levers 16 and retraction of the plungers 12 from the notches 14.

With the rotary structure 6 latched in its position of Fig. 1, the implement serves as a drag scraper; the effective cutting depth of the blade 10 being regulated by vertical adjustment of the power actuated hitch assembly 4.

For use to chisel or scarify the earth, the implement is provided with the following arrangement:

At a point spaced circumferentially a substantial distance from the blade 10 the rotary structure 6 is fitted, between the ends 7, with a transverse, horizontal tool bar 20 to which a plurality of spaced standards 21 are adjustably secured by clamps 22; the standards 21 being disposed toward the rear of said rotary structure 6 and projecting upwardly when the blade 10 is in operation. At their outer ends the standards 21 are fitted with blades or chisels 23.

To accomplish the chiseling or scarifying operations the spring-pressed latch units 11 are released from the notches 14 and the tractor run slowly in a rearward direction, causing rotation, by reason of frictional engagement with the ground, of the rotary structure 6. Adjacent the edge of the wall 9 opposite the blade 10, and centrally of the ends of such wall, the same is fitted with an outwardly projecting traction cleat 24 which assures of continued rotation of the rotary structure 6, as the tractor backs up, until the standards 21 are at the lower part of said structure 6 and project downwardly therefrom in the manner shown in Fig. 3.

In this position of the parts, the spring-pressed plungers 12 of the latch units 11 snap into other notches 25 formed in the ends 7 in generally opposite relation to the notches 14. This locks the rotary structure 6 against rotation during the earth chiseling or scarifying operation; the hitch assembly 4 being vertically adjusted to regulate the depth of penetration of the chisels 23.

This invention provides a practical and convenient implement for the dual purposes described, at the selection of the operator; the rotary structure 6 being capable of being set to either of its adjusted positions without the tractor operator leaving his seat.

In order that the implement may be used as a back-up bulldozer or back-filler, other latch engaging notches 14a are provided in the bowl ends 7 opposite notches 14. Thus, when the bowl is reversed in the frame (by first removing the trunnions 8) said bowl may be held with blade 10 facing rearwardly or in position to serve as a back-up bulldozer.

From the foregoing description it will be readily seen that there has been produced such a device as substantially fulfills the objects of the invention as set forth herein.

While this specification sets forth in detail the present and preferred construction of the device, still in practice such deviations therefrom may be resorted to as do not form a departure from the spirit of the invention, as defined by the appended claims.

Having thus described the invention, the following is claimed as new and useful, and upon which Letters Patent are desired:

1. A ground working implement comprising a draft frame adapted to be coupled to a tractor, the draft frame including transversely spaced draft beams, a bowl-like rotary structure extending between and journaled in connection with the draft beams for rotation about a transverse, horizontal axis, the rotary structure including rotary ends rigidly connected together by a transverse wall, releasable latch means on the draft frame cooperating with the rotary structure to lock the latter in selective rotative positions, a transverse, earth digging blade mounted on the rotary structure along one transverse edge of the wall, and a plurality of earth working teeth mounted on and projecting outwardly from the rotary structure in circumferentially spaced relation to the transverse blade, the blade being in a lowered, working position and the teeth raised when the rotary structure is in one of said rotative positions, and the teeth being in a lowered, working position and the blade raised when the rotary structure is in another of said rotative positions, the wall being disposed to the front of the rotary structure and clear of the teeth when the latter are in lowered working position.

2. A ground working implement comprising a draft frame adapted to be coupled to a tractor, the draft frame including transversely spaced draft beams, a bowl-like rotary structure extending between and journaled in connection with the draft beams for rotation about a transverse, horizontal axis, the rotary structure including rotary ends rigidly connected together by a transverse wall, releasable latch means on the draft frame cooperating with the rotary structure to lock the latter in selective rotative positions, a transverse, earth digging blade mounted on the rotary structure along one transverse edge of the wall, and a plurality of earth working teeth mounted on and projecting outwardly from the rotary structure in circumferentially spaced relation to the transverse blade, the blade being in a lowered, working position and the teeth raised when the rotary structure is in one of said rotative positions, and the teeth being in a lowered, working position and the blade raised when the rotary structure is in another of said rotative positions; there being a transverse tool bar mounted in the rotary structure between the ends thereof, and a plurality of standards secured to the tool bar, the teeth being on the outer ends of said standards.

3. A ground working implement comprising a rotary structure including rotary ends and a transverse wall rigidly connecting said ends adjacent their periphery, a transverse, earth digging blade secured to the wall along one edge thereof, a transverse horizontal tool bar extending in the rotary structure adjacent the opposite edge of the wall, a transverse row of earth working teeth mounted on the tool bar and projecting outwardly of the rotary structure, a draft frame in which the rotary structure is journaled on a transverse, horizontal axis, and means between the frame and structure operative to releasably lock the latter in position with the blade or the teeth in lowered, working position, selectively.

4. A ground working implement comprising a supporting frame for draft attachment to a tractor, a pair of disc-like end members spaced apart transversely of the implement and mounted for rotation in the frame about a central axis, a single relatively narrow wall extending between the end members adjacent their outer periphery and conforming to the curvature thereof, a scraping blade along one edge of the wall, a plurality of transversely spaced scarifying teeth supported on and between the end members and projecting radially outward from between said members at points clear of and beyond the other edge of the wall and facing toward said wall, and means for releasably holding the end members relative to the supporting frame with the scraping blade in the ground, or with the scarifying teeth in the ground, selectively.

ROYAL B. LAIRD.

REFERENCES CITED

The following references are of record in the file of this patent:

UNITED STATES PATENTS

| Number | Name | Date |
|---|---|---|
| 178,948 | Patterson | June 20, 1876 |
| 1,691,153 | Hiscock | Nov. 13, 1928 |
| 1,861,762 | Terhaar | June 7, 1932 |
| 2,076,939 | Cox | Apr. 13, 1937 |
| 2,227,624 | Benbow et al. | Jan. 7, 1941 |
| 2,262,415 | Williams et al. | Nov. 11, 1941 |

FOREIGN PATENTS

| Number | Country | Date |
|---|---|---|
| 22,148/29 | Australia | July 3, 1930 |